(12) United States Patent
Chauvel et al.

(10) Patent No.: US 6,996,683 B2
(45) Date of Patent: Feb. 7, 2006

(54) CACHE COHERENCY IN A MULTI-PROCESSOR SYSTEM

(75) Inventors: Gerard Chauvel, Antibes (FR); Serge Lasserre, Frejus (FR); Maija Kuusela, Mouans Sartoux (FR); Dominique D'Inverno, Villeneuve Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 361 days.

(21) Appl. No.: 10/632,229

(22) Filed: Jul. 31, 2003

(65) Prior Publication Data

US 2004/0078528 A1 Apr. 22, 2004

Related U.S. Application Data

(60) Provisional application No. 60/400,391, filed on Jul. 31, 2002.

(30) Foreign Application Priority Data

Jul. 30, 2003 (EP) .................................. 03291925

(51) Int. Cl.
*G06F 12/02* (2006.01)
(52) U.S. Cl. ...................................... 711/141; 711/142
(58) Field of Classification Search ...................... None
See application file for complete search history.

(56) References Cited

U.S. PATENT DOCUMENTS

| | | | | |
|---|---|---|---|---|
| 4,812,973 A | * | 3/1989 | Kinoshita | .................... 710/266 |
| 5,627,993 A | * | 5/1997 | Abato et al. | ................. 711/143 |
| 5,708,243 A | * | 1/1998 | Karasik et al. | ........... 200/61.54 |
| 6,098,089 A | | 8/2000 | O'Connor et al. | ........... 709/104 |
| 6,349,361 B1 | * | 2/2002 | Altman et al. | .............. 711/121 |
| 6,567,905 B2 | | 5/2003 | Otis | ........................... 711/170 |
| 6,571,260 B1 | | 5/2003 | Morris | ....................... 707/206 |
| 6,754,774 B2 | * | 6/2004 | Gruner et al. | .............. 711/119 |
| 6,778,463 B2 | * | 8/2004 | Chen | ..................... 365/230.06 |
| 6,801,984 B2 | * | 10/2004 | Arimilli et al. | ............. 711/146 |
| 2002/0065990 A1 | | 5/2002 | Chauvel et al. | ............. 711/137 |
| 2002/0069332 A1 | | 6/2002 | Chauvel et al. | ............. 711/144 |
| 2003/0101320 A1 | | 5/2003 | Chauvel et al. | ............. 711/154 |
| 2003/0126365 A1 | * | 7/2003 | Jamil et al. | ................. 711/120 |

OTHER PUBLICATIONS

*Embedded JAVA*, Vincent Perrier, Aug. 15, 2001, (3 p.); Online http://www.onjava.com/pub/a/onjava/synd/2001/08/15/embedded.html.

* cited by examiner

*Primary Examiner*—Kevin Verbrugge
*Assistant Examiner*—Daniel B. Ko
(74) *Attorney, Agent, or Firm*—Ronald O. Neerings; Wade James Brady, III; Frederick J. Telecky, Jr.

(57) ABSTRACT

A system comprises a first processor having cache memory, a second processor having cache memory and a coherence buffer that can be enabled and disabled by the first processor. The system also comprises a memory subsystem coupled to the first and second processors. For a write transaction originating from the first processor, the first processor enables the second processor's coherence buffer, and information associated with the first processor's write transaction is stored in the second processor's coherence buffer to maintain data coherency between the first and second processors.

13 Claims, 1 Drawing Sheet

US 6,996,683 B2

CACHE COHERENCY IN A MULTI-PROCESSOR SYSTEM

CROSS-REFERENCE TO RELATED APPLICATIONS

This application claims priority to U.S. Provisional Application Ser. No. 60/400,391 titled "JSM Protection," filed Jul. 31, 2002, incorporated herein by reference. This application also claims priority to EPO Application No. 03291925.0, filed Jul. 30, 2003 and entitled "Cache Coherency In A Multi-Processor System," incorporated herein by reference. This application also may contain subject matter that may relate to the following commonly assigned co-pending applications incorporated herein by reference: "System And Method To Automatically Stack And Unstack Java Local Variables," Ser. No. 10/632,228, filed Jul. 31, 2003, "Memory Management Of Local Variables," Ser. No. 10/632,067, filed Jul. 31, 2003, "Memory Management Of Local Variables Upon A Change Of Context," Ser. No. 10/632,076, filed Jul. 31, 2003, "A Processor With A Split Stack," Ser. No. 10/632,079, filed Jul. 31, 2003, "Using IMPDEP2 For System Commands Related To Java Accelerator Hardware," Ser. No. 10/632,069, filed Jul. 31, 2003, "Test With Immediate And Skip Processor Instruction," Ser. No. 10/632,214, filed Jul. 31, 2003, "Test And Skip Processor Instruction Having At Least One Register Operand," Ser. No. 10/632,084, filed Jul. 31, 2003, "Synchronizing Stack Storage," Ser. No. 10/631,422, filed Jul. 31, 2003, "Methods And Apparatuses For Managing Memory," Ser. No. 10/631,252, filed Jul. 31, 2003, "Write Back Policy For Memory," Ser. No. 10/631,185, filed Jul. 31, 2003, "Methods And Apparatuses For Managing Memory," Ser. No. 10/631,252, filed Jul. 31, 2003, "Mixed Stack-Based RISC Processor," Ser. No. 10/631,308, filed Jul. 31, 2003, "Processor That Accommodates Multiple Instruction Sets And Multiple Decode Modes," Ser. No. 10/631,246, filed Jul. 31, 2003, "System To Dispatch Several Instructions On Available Hardware Resources," Ser. No. 10/631,585, filed Jul. 31, 2003, "Micro-Sequence Execution In A Processor," Ser. No. 10/632,216, filed Jul. 31, 2003, "Program Counter Adjustment Based On The Detection Of An Instruction Prefix," Ser. No. 10/632,222, filed Jul. 31, 2003, "Reformat Logic To Translate Between A Virtual Address And A Compressed Physical Address," Ser. No. 10/632,215, filed Jul. 31, 2003, "Synchronization Of Processor States," Ser. No. 10/632,024, filed Jul. 31, 2003, "Conditional Garbage Based On Monitoring To Improve Real Time Performance," Ser. No. 10/631,195, filed Jul. 31, 2003, "Inter-Processor Control," Ser. No. 10/631,120, filed Jul. 31, 2003, "Concurrent Task Execution In A Multi-Processor, Single Operating System Environment," Ser. No. 10/632,077, filed Jul. 31, 2003, and "A Multi-Processor Computing System Having A Java Stack Machine And A RISC-Based Processor," Ser. No. 10/631,939, filed Jul. 31, 2003.

BACKGROUND

1. Technical Field

The present invention relates generally to multi-processor system and more particularly to cache coherency in a multi-processor system.

2. Background Information

Some electronic systems include multiple processors. Such systems may also include memory that is accessible and shared by the processors. Because multiple processors may be able to access shared data, a mechanism is needed to ensure data coherency.

BRIEF SUMMARY

In some embodiments, a system comprises a first processor having cache memory, a second processor having cache memory and a coherence buffer that can be enabled and disabled by the first processor. The system also comprises a memory subsystem coupled to the first and second processors. For a write transaction originating from the first processor, the first processor enables the second processor's coherence buffer, and information associated with the first processor's write transaction is stored in the second processor's coherence buffer to maintain data coherency between the first and second processors.

In other embodiments, a method comprises:

when a first processor originates a write transaction to shared data, enabling a second processor's coherence buffer, and storing information associated with the first processor's write transaction in the second processor's coherence buffer to maintain data coherency between the first and second processors, and when the second processor originates a write transaction to shared data, sending a write exception to the first processor to cause the first processor to write data into cache local to the first processor.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
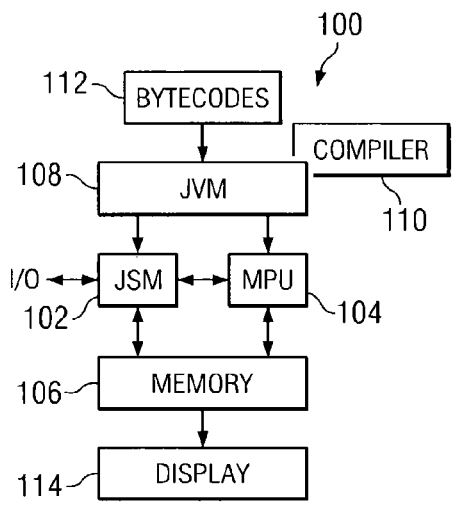
FIG. 1 shows a diagram of a system in accordance with preferred embodiments of the invention and including a Java Stack Machine ("JSM") and a Main Processor Unit ("MPU")

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. The memory 106 preferably is external to both the processors 102 and 104. At least a portion of the memory 106 may be shared by both processors meaning that both processors may access the same shared memory locations. Further, if desired, a portion of the memory 106 may be designated as private to one processor or the other. The memory may comprise some areas that are designated as cacheable and other areas that are not cacheable. Memory may be divided into cacheable and non-cacheable regions and the cacheable memory regions may be shared between the processors 102 and 104.

Figure 2:
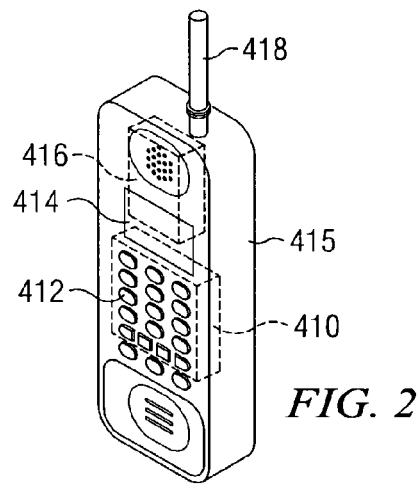
FIG. 2 depicts an exemplary embodiment of the system described herein in the form of a communication device (e.g., cellular telephone)

System 100 preferably also includes a Java Virtual Machine ("JVM") 108, compiler 110, and a display 114. The JSM 102 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may include, without limitation, a battery and an analog transceiver to permit wireless communications with other devices. As such, while system 100 may be representative of, or adapted to, a wide variety of electronic systems, an exemplary electronic system may comprise a battery-operated, mobile cell phone such as that shown in FIG. 2. As shown in FIG. 2, a mobile communications device includes an integrated keypad 412 and display 414. The JSM 102 and MPU 104 noted above and other components may be included in electronics package 410 which may be coupled to keypad 410, display 414, and radio frequency ("RF") circuitry 416 which may be connected to an antenna 418.

Referring again to FIG. 1, as is generally known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown), which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, bytecode verifier, garbage collector, and a bytecode interpreter loop to interpret the bytecodes that are not executed on the JSM processor 102.

Figure 3:
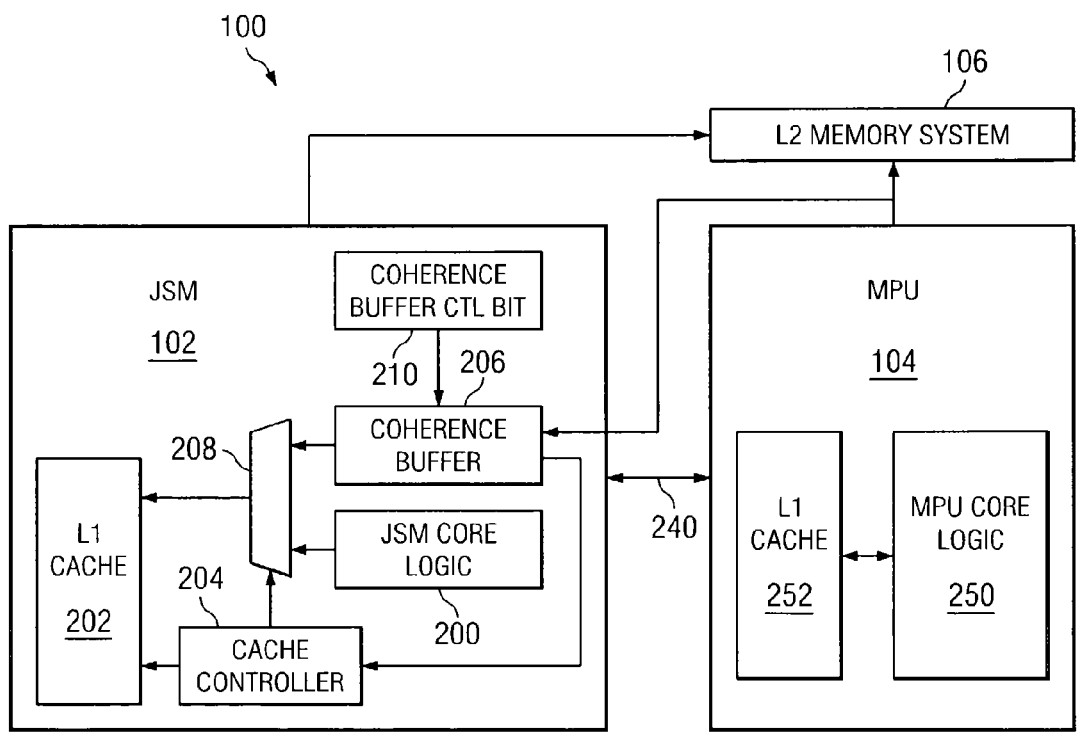
FIG. 3 depicts a preferred embodiment of a cache coherency technique.

FIG. 3 shows another embodiment of a system comprising the JSM 102, MPU 104 and memory system 106. Memory system 106 preferably comprises an L2 memory system, which is well known. Additional detail is shown regarding the JSM 102 and MPU 104.

As shown, JSM 102 preferably includes JSM core logic 200, an L1 cache 202, a cache controller 204, a coherence buffer 206, a multiplexer 208, and a coherence buffer control bit 210. The multiplexer 208 provides data from either the coherence buffer 206 or the core logic 200 to the L1 cache under the control of the cache controller 204. The MPU 104 preferably includes an MPU core logic 250 coupled to an L1 cache 252. Each processor 102 and 104 may include other components that are not specifically shown in FIG. 3. The coherence buffer 206 indicates to the cache controller 204 its status as "empty" (not containing data) or "not empty" (containing data). The coherence buffer 206 is linked to the processor 104 to catch write requests originating from processor 104 when the coherence buffer is enabled.

In general, either processor 102, 104 may originate a transaction targeting a shared, cacheable data value. A shared, cacheable data value is a value that, despite being shared, may be stored in the L1 cache of both the processors 102 and 104. When either of the processors initiates a write transaction to a cacheable memory location, a possible cache coherency problem may result. The target data value resides in L2 memory 106 as well as possibly in one or both of the processors' L1 caches 202 and 252. If the processor desiring to perform the write transaction to a target value performs the write, the other processor's copy of the same data value will be "outdated" unless a cache coherency technique is implemented.

In accordance with the preferred embodiment of the invention, the preferred cache coherency technique is as follows. The coherency technique implemented in the multi-processor system 100 preferably is asymmetric meaning that the process for maintaining data coherency is different when the MPU 104 originates a write request versus when the JSM 102 originates a write request. The coherency process when the MPU 104 originates a write request will be described first followed by a description of the coherency process when the JSM 102 originates a write request.

When the MPU 104 writes to shared data, the MPU obtains an appropriate "semaphore." A shared data value cannot be written to by a processor unless the processor obtains the semaphore. The semaphore thus controls access to shared data. The semaphore may comprise a flag or other suitable mechanism. After obtaining the suitable semaphore, the MPU 104 preferably enables the coherence buffer 206 of the JSM 102. Enabling the JSM's coherence buffer may be performed by setting the coherence buffer control bit to an "enabled" state. Once the coherence buffer 206 is enabled by the MPU 104, the MPU then performs the write transaction to the shared data in its own L1 cache 252 and also propagates the write transaction to the L2 memory 106. The write is detected by the coherence buffer 206 which obtains the write data with relevant information. The relevant information may comprise the data being written by the MPU 104 and/or the address targeted by the write transaction.

As explained above, the write transaction from the MPU 104 is propagated to the L2 memory 106. The propagation of the write transaction is performed if the MPU's L1 cache policy is a "write through" cache technique in which all writes to cached data are written to both L1 cache and L2 memory to maintain L2 memory coherent with L1 cache. In the event a "copyback" cache policy is implemented in which writes do not automatically spawn writes to L2 memory, the newly written data in the MPU's L1 cache is explicitly copied to the L2 memory by a "clean-line" instruction in which the cache line containing the newly written data is copied to L2 memory 107.

Once the relevant information is stored in the JSM's coherence buffer, the JSM's L1 cache is updated to maintain data coherency. When the data to be written is actually stored in the coherence buffer, the cache controller 204 activates the multiplexer 208 so as to cause the MPU's write data stored in the coherence buffer to be written to the JSM L1 cache 102 if the corresponding data is present in the L1 cache and comprises an outdated value. If the corresponding data is not present in the JSM's L1 cache 202, the coherence buffer 206 discards the data and does not update the L1 cache. As such, the JSM is coherent with the MPU 104. Alternatively, if the target address of the MPU's write transaction is stored in the JSM's coherence buffer 206, the L1 cache line corresponding to the target address stored in the coherence buffer 206 is invalidated if the data is present in the L1 cache 202 of the JSM 102. The L1 cache 202 preferably includes a plurality of individually accessible lines and each line has an associated valid bit (not specifically shown). The cache controller 204 thus can read the target address of the MPU's write transaction from the coherence buffer 206 and clear the valid bit of the corresponding line in the L1 cache 202.

Once the MPU has completed its write to the shared data in the L2 memory 106, the MPU 104 causes the JSM's coherence buffer 206 to be disabled. Disabling the coherence buffer 206 may be accomplished by clearing the coherence buffer control bit 210. As such, the JSM 102 is caused to be coherent with the MPU 104 through the selective initiation by the MPU of the JSM's coherence logic (i.e., the coherence buffer control bit 210, the coherence buffer 206 and the L1 cache 202). By selectively enabling and disabling the JSM's coherency logic, the JSM can be prevented from stalling during times that the MPU 104 is not writing shared data. The JSM 102 may stall for one cycle if there is a data cache conflicting access.

Referring still to FIG. 3, the coherency process will now be described for maintaining the MPU 104 coherent with the JSM 102 during a write transaction originated by the JSM 102. The MPU 104 does not have a coherence buffer such as that described above with regard to the JSM 102. Instead, when the JSM 102 writes to shared data, the JSM writes a new value to its L1 cache 202 and also sends a write exception to the MPU 104. In this context, a write exception is a write transaction that stores the data and address values in a location that can be read by the MPU exception (interrupt) handler. The MPU 104 includes a write exception handler that responds to the write exception from the JSM 102 by performing a write of the JSM's data to the MPU's L1 cache 252. Preferably, the MPU 104 completes the write exception before accessing data that is shared.

As described herein, the JSM 102 need not have exception management logic, thereby permitting a relatively simple core to be implemented in the JSM. Additionally, the MPU L1 cache 252 does not need to support costly hardware coherence protocol such as "MESI" or others based on snooping the JSM bus activity thereby providing a much simpler and therefore faster L1 cache system on the MPU.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, both processors in the system may comprise coherence buffers as described above. Accordingly, the scope of protection is not limited by the description set out above. Each and every claim is incorporated into the specification as an embodiment of the present invention.

What is claimed is:

1. A system, comprising:
 a first processor having cache memory;
 a second processor having cache memory and a coherence buffer that can be enabled and disabled by the first processor; and
 a memory subsystem coupled to the first and second processors;
 wherein for a write transaction originating from the first processor, the first processor enables the second processor's coherence buffer, and information associated with the first processor's write transaction is stored in the second processor's coherence buffer to maintain data coherency between the first and second processors.

2. The system of claim 1 wherein for write transactions originating from the second processor, the second processor sends a write exception to the first processor to maintain data coherency with an L1 cache system included in the first processor.

3. The system of claim 1 wherein the information stored in the coherence buffer is written to the second processor's cache memory.

4. The system of claim 3 wherein, while writing the data from the second processor's coherence buffer to the cache memory, the second processor stalls if the second processor accesses the cache memory concurrently with the information being written.

5. The system of claim 1 wherein the information stored in the second processor's coherence buffer includes an address and the second processor invalidates a line in the second processor's cache corresponding to the address.

6. The system of claim 1 wherein the first processor disables the second processor's coherence buffer upon completing a write transaction to shared data.

7. The system of claim 1 wherein the memory subsystem comprises an L2 memory subsystem and information is stored in the second processor's coherence buffer concurrently with the write transaction completing to the L2 memory subsystem.

8. The system of claim 1 wherein a control bit is associated with the coherence buffer and is programmable by the first processor to enable or disable the coherence buffer.

9. The system of claim 1 wherein the first processor enables the first processor's coherence buffer upon originating a write transaction to an area of shared memory in the memory subsystem.

10. A cache coherency method usable in a multi-processor system, comprising:
 when a first processor originates a write transaction to shared data, enabling a second processor's coherence buffer, and storing information associated with the first processor's write transaction in the second processor's coherence buffer to maintain data coherency between the first and second processors; and when the second processor originates a write transaction to shared data, sending a write exception to the first processor to cause the first processor to write data into cache local to the first processor.

11. The method of claim 10 wherein the information comprises an address associated with the write transaction originated by the first processor and the method further comprises invalidating a line in the second processor's cache corresponding to the address.

12. The method of claim 10 wherein the information comprises a data value being written by the write transaction originated by the first processor and the method further comprises writing the data value to cache memory in the second processor.

13. The method of claim 10 wherein the first processor disables the coherence buffer in the second processor after completing the write transaction originated by the first processor.

* * * * *